(12) United States Patent
Oberle

(10) Patent No.: US 8,085,150 B2
(45) Date of Patent: Dec. 27, 2011

(54) INVENTORY SYSTEM FOR RFID TAGGED OBJECTS

(75) Inventor: Robert R. Oberle, Macungie, PA (US)

(73) Assignee: RCD Technology Inc

( * ) Notice: Subject to any disclaimer, the term of this patent is extended or adjusted under 35 U.S.C. 154(b) by 182 days.

(21) Appl. No.: 12/104,618

(22) Filed: Apr. 17, 2008

(65) Prior Publication Data

US 2008/0297356 A1    Dec. 4, 2008

Related U.S. Application Data

(60) Provisional application No. 60/940,476, filed on May 29, 2007.

(51) Int. Cl.
*G08B 13/14* (2006.01)
(52) U.S. Cl. ............... 340/572.7; 340/568.1; 340/539.1
(58) Field of Classification Search ............ 340/572.7, 340/572.1–572.6, 572.8–572.9, 568.1, 539.1, 340/539.22, 5.92, 539.26
See application file for complete search history.

(56) References Cited

U.S. PATENT DOCUMENTS

| | | | |
|---|---|---|---|
| 5,822,714 A * | 10/1998 | Cato | 702/108 |
| 6,707,381 B1 * | 3/2004 | Maloney | 340/568.1 |
| 6,724,308 B2 * | 4/2004 | Nicholson | 340/572.1 |
| 7,084,769 B2 * | 8/2006 | Bauer et al. | 340/572.7 |
| 7,183,920 B2 * | 2/2007 | Napolitano | 340/572.1 |
| 7,502,707 B2 * | 3/2009 | Da Silva Neto | 702/122 |
| 7,656,858 B2 * | 2/2010 | Campero et al. | 370/351 |
| 7,764,163 B2 * | 7/2010 | Miller | 340/10.1 |
| 2008/0024278 A1 * | 1/2008 | Volpi et al. | 340/10.1 |
| 2008/0079578 A1 * | 4/2008 | Kim et al. | 340/572.1 |
| 2008/0129454 A1 * | 6/2008 | Chen et al. | 340/10.1 |

\* cited by examiner

*Primary Examiner* — Daniel Previl
(74) *Attorney, Agent, or Firm* — Fliesler Meyer LLP

(57) ABSTRACT

A case for containing objects can include a Radio Frequency Identification (RFID) Reader antenna to detect any RFID tags placed within the case. The RFID antenna can operably connect with external RFID Reader components to detect RFID tags in the case. Alternately, a case can also include a passive RFID antenna to couple with any RFID tags in the case.

9 Claims, 2 Drawing Sheets

INVENTORY SYSTEM FOR RFID TAGGED OBJECTS

CLAIM OF PRIORITY

This application claims priority to U.S. Provisional Application No. 60/940,476 entitled "INVENTORY SYSTEM FOR RFID TAGGED OBJECTS" filed May 29, 2007, which is incorporated herein by reference.

SUMMARY OF INVENTION

Radio Frequency Identification (RFID) systems are often used for tracking inventory through supply and distribution networks. In these systems, an object will move from point to point along a distribution chain. In many cases, the tracked object moves linearly through without circulating back to a previous point; an example is the tracking of goods in a retail supply chain. Similar systems are also well established in closed loop inventory applications wherein the object tracked moves into and out of a closed perimeter, a well known example of this type of application is the tracking of library books into and out of public libraries.

Tracking is typically accomplished through the use of a passive RFID tag. The tag can consist of an integrated circuit (IC) coupled to a suitable antenna, incorporated into a suitable package. In many cases, the package takes the form of a self adhesive label. In other cases the tag may be incorporated directly into the object or the box or carton in which the object is transported. The tags can be read by an RFID reader which can consist of a suitably configure field (reader) antenna connected to a fixed reader which interfaces with a computer system. RFID readers are commonly configured to be stand-alone, connected to a single computer or networked i.e. connected to a network of computers through a suitable routing or switching architecture. The field antenna and reader configuration can vary widely with application. In general inductively coupled tags are prevalent at lower frequencies <100 Megahertz (MHz) owing to the size of a dipole antenna at these frequencies. In this case both antennae (reader and tag) take the form of a suitably designed coil tuned to the desired operating frequency. One widely used frequency band is centered at 13.56 MHz.

It can be desirable to monitor the movement of small high value objects. The objects can be grouped together in a case. This case may be designed specifically to house the objects being tracked, and may incorporate physical security features. It is often desirable to monitor the contents of the case through the use of an RFID inventory system, the system being configured such that the tracked objects are neither removed from the case nor is the case opened for inventory. This is particularly important in the shipment of high value or environmentally sensitive items.

The standard way for taking inventory of a case is to either pass the case through a portal that is monitored by RFID readers or place the case on a pad housing the field antenna. In the majority of cases this is an acceptable solution. However when the tag is physically small the required geometry of the objects may make reading the tags difficult owing to the limited read distance of passive RFID tags. Read distance is generally defined as the maximum distance between the tag and the field antenna when each is oriented plane parallel to the other. The distance is generally measured with the geometric center of the tag and the field antenna aligned on a common axis.

As a general rule RFID tags that utilize inductive coupling between the field antenna and the tag have a maximum read distance of 4-5 times the longest characteristic length of the tag antenna, i.e. if the tag antenna is a rectangle 2 in. by 3 in. the maximum read distance is 12-15 in. Many factors influence the maximum read distance of a given tag such as, electrical properties of packaging materials, geometrical relationship between reader antenna and tag, presence of conductive or magnetic materials in close proximity to either antenna, or power radiated from the reader antenna.

It is possible to ameliorate the difficulties of reading a small inductively coupled tag in a case by passing the case through the center of the reader antenna. This configuration effective reduces the read distance to zero as the tag passes through the plane of the reader antenna; however it places constraints on the size of the case that may be used. Another technique that is employed is the use of multiple reader antennae in order to expand the volume in which a given tag can be read. Neither of these solutions is completely desirable since they may require field antenna reconfiguration for varying case configurations and sizes.

Another possible solution is to use a handheld scanner and manually scan each case. While this provides for a high degree of confidence in the authentication of the objects it requires a considerable amount of time and labor, thus negating many of the benefits of an automatic identification process.

DETAILED DESCRIPTION

An RFID antenna embedded in a case can be used to improve the detection of the RFID tags of objects in a case.

Figure 1A:
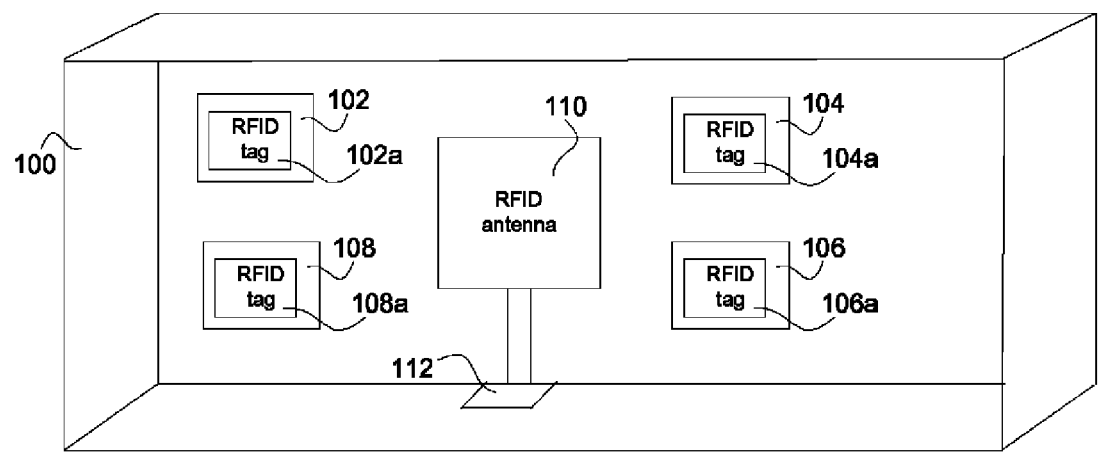
FIGS. 1A-1B illustrates a first embodiment of the present invention with an RFID antenna in a case that connects to additional RFID reader components.
Figure 1B:
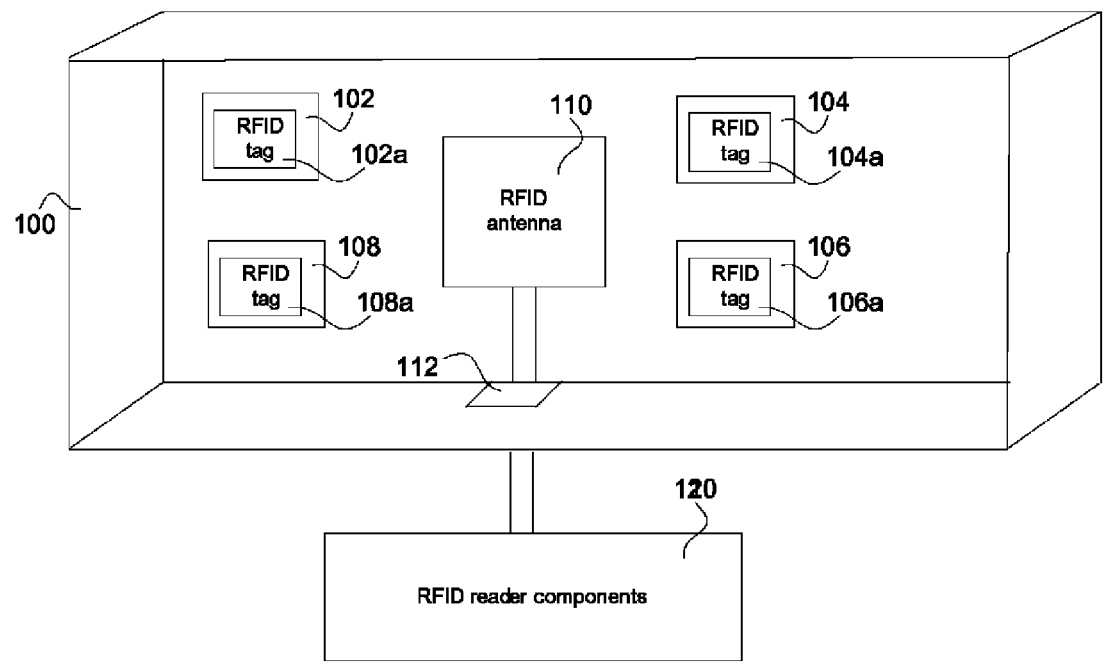

FIGS. 1A-1B show an example with a case 100 can contain objects, such as objects 102, 104, 106 and 108. The case 100 can include a RFID Reader antenna 110 to detect any RFID tag such as tags 102a, 104a, 106a and 108a placed within the case 100.

In the example of FIGS. 1A-1B, the case 100 has a connector 112 to connect the RFID reader antenna 110 to external RFID reader components 120.

The reader antenna can be embedded or otherwise located in the case in which the objects to be tracked reside. The RFID antenna of the case can be configured for optimum read performance and eliminate the requirement for reader reconfiguration for different case configurations.

The case may be fitted with an appropriate electrical connection that makes a physical connection to a mating connector on the reader. Upon connection, the reader can use the case antenna in the same manner as a conventional field antenna.

Figure 2A:
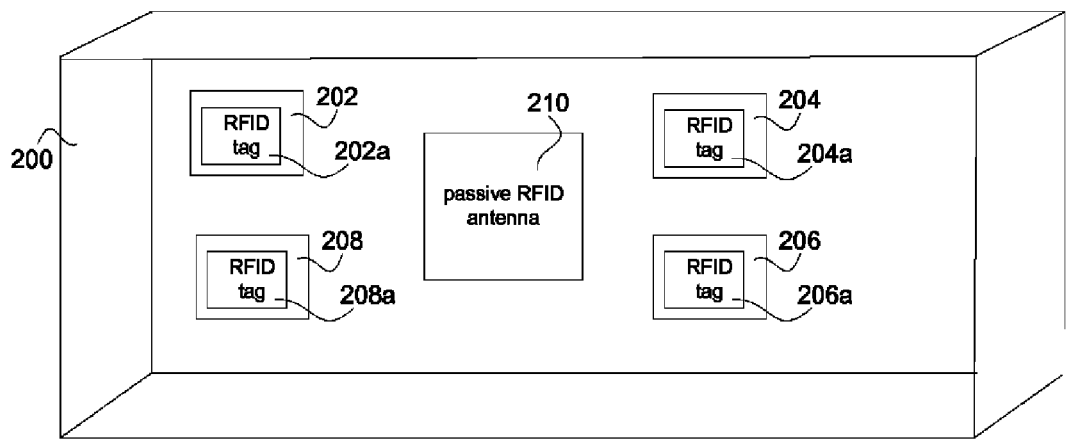
FIGS. 2A-2B illustrates a second embodiment of the present invention with a passive RFID antenna in a case.
Figure 2B:
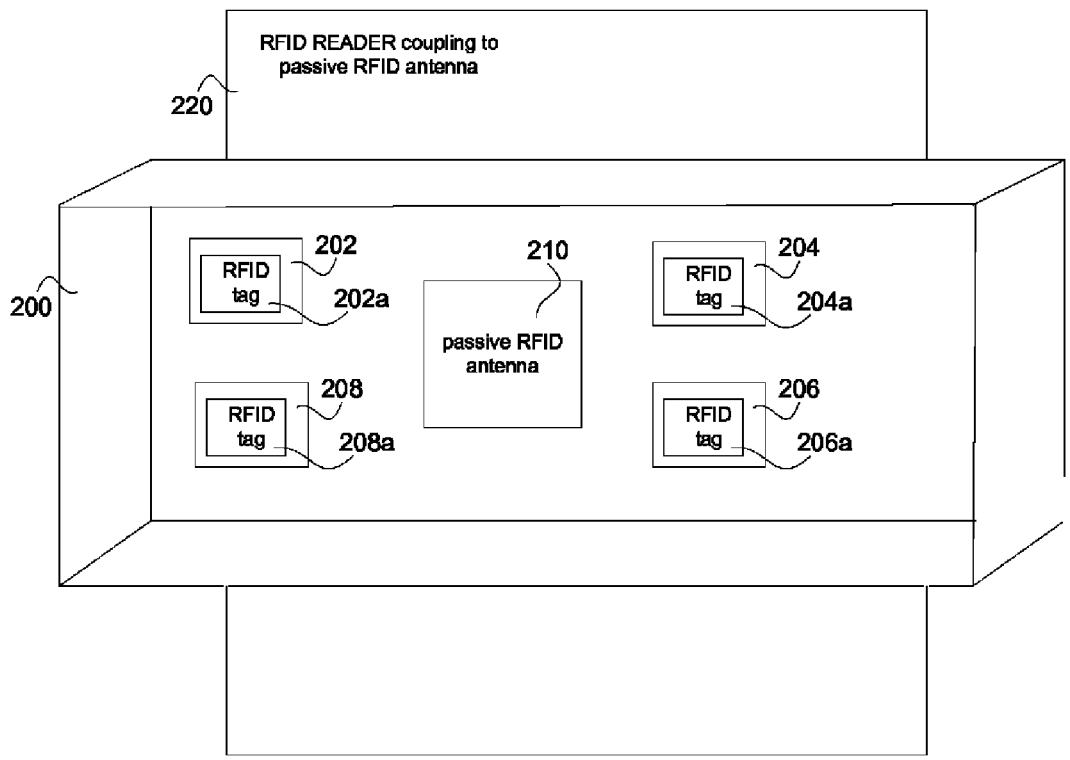

FIGS. 2A-2B shows another example with a case 200 for containing objects. The case 200 can include a passive resonant antenna 210 to couple with RFID tags such as RFID tags 202a, 204a, 206a and 208a when they are in the case. The case 200 can be sized to contain multiple objects with RFID tags.

The RFID reader antenna can be arranged to be coplanar with the passive resonant antenna 210. The passive RFID antenna 210 can couple with an external RFID antenna 220 to the RFID tags in the case 200.

One method comprises providing a case 200 including a passive resonant antenna 210; placing multiple objects 202, 204, 206, and 208 with the RFID tags 202A, 204a, 206a and 208a into the case 200 and using the passive resonant antenna 210 to detect the RFID tags 202a, 204a, 206a and 208a.

The passive resonant antenna can be built into the structure of the case. This resonant antenna can be configured to provide the best read configuration possible for the tagged objects and eliminate the necessity of making a physical connection between the case antenna and the reader.

The case with the tagged items can be placed on a pad 220 which houses a conventional field antenna. The signal from the field antenna can couple into the passive resonant antenna (embedded antenna), which in an optimum configuration is coplanar with the RFID tags. The passive resonant antenna can couple with the tags and allow for bidirectional communication between the tags and the reader. The configuration and resonant tuning of the embedded tag is of primary importance to the function of the system, however, once constructed and tuned the embedded antenna will remain stable.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A case for containing objects, the case including a Radio Frequency Identification (RFID) Reader antenna to detect any RFID tags placed within the case;
   wherein the case does not contain any active RFID reader components; and wherein the RFID reader antenna in the case is arranged to operably connect to an external RFID Reader to detect any RFID tags placed within the case; and
   wherein the case has a physical mating connector to physically connect the RFID reader antenna to external RFID reader components.

2. The case of claim 1, further comprising RFID tags positioned in the case.

3. The case of claim 2, wherein the RFID tags are associated with objects.

4. A case for containing objects, the case including a passive resonant antenna to couple with Radio Frequency Identification (RFID) tags when the RFID tags are in the case, the case being sized to contain multiple objects with the RFID tags; and
   wherein the passive resonant antenna electromagnetically couples with the RFID tags when they are in the case to improve the ability of an external RFID reader with an external antenna to read the RFID tags using the external antenna.

5. The case of claim 4, further comprising the RFID tags.

6. The case of claim 5, wherein the RFID tags are on objects.

7. The case of claim 6, wherein the RFID tags antenna are arranged to be coplanar with the passive resonant antenna.

8. A method comprising:
   providing a case including a passive resonant antenna;
   placing multiple objects with Radio Frequency Identification (RFID) tags into the case;
   using the passive resonant antenna to detect the RFID tags;
   wherein the passive resonant antenna electromagnetically couples with the RFID tags when the RFID tags are in the case to improve the ability of an external RFID reader with an external antenna to read the RFID tags using the external antenna; and
   wherein the case does not contain any active RFID reader components.

9. The method of claim 8, wherein the RFID tags antenna are arranged to be coplanar with the passive resonant antenna.

* * * * *